United States Patent
Saito et al.

(10) Patent No.: US 7,349,747 B2
(45) Date of Patent: Mar. 25, 2008

(54) MONITORING DEVICE AND MONITORING METHOD FOR INJECTION MOLDING MACHINE

(75) Inventors: Osamu Saito, Yamanashi (JP); Kenji Araki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/177,414

(22) Filed: Jul. 11, 2005

(65) Prior Publication Data

US 2006/0009874 A1    Jan. 12, 2006

(30) Foreign Application Priority Data

Jul. 9, 2004    (JP) .............................. 2004-202996

(51) Int. Cl.
  G05B 11/01    (2006.01)
  G05B 15/00    (2006.01)
  B29C 45/00    (2006.01)
  B29C 39/00    (2006.01)
(52) U.S. Cl. .......................... 700/83; 700/17; 700/197; 700/200
(58) Field of Classification Search ................ 700/200, 700/197, 204, 17, 83
See application file for complete search history.

(56) References Cited

U.S. PATENT DOCUMENTS 5,470,218 A * 11/1995 Hillman et al. ............. 425/144
5,792,483 A * 8/1998 Siegrist et al. .............. 425/135

6,311,101 B1 * 10/2001 Kastner ...................... 700/197

(Continued)

FOREIGN PATENT DOCUMENTS

EP    0 737 560    10/1996

(Continued)

OTHER PUBLICATIONS

Translation of Japan Publication No. 2001293761; obtained using Japanese Patent Office's website and search engine.*

(Continued)

*Primary Examiner*—Ronald Hartman, Jr.
(74) *Attorney, Agent, or Firm*—Staas & Halsey LLP

(57)    ABSTRACT

A monitoring device and a monitoring method for an injection molding machine, in which a trend chart is displayed on a common axis so that changes of set values of molding conditions and changes of measured values of monitoring items can be grasped correspondingly. A history of the measured values of the monitoring items is stored, and a change history of the set values of the molding conditions is also stored. An operator sets monitoring items and molding condition items to be displayed. In doing this, the operator sets a display range such that molding condition items having changed set values within the display range are displayed and selected. Alternatively, coefficients of correlation between the measured values of the selected monitoring items and the set values of the molding conditions are obtained, and the molding condition items are displayed in the order of priority of correlation and selected. For example, a metering time, minimum cushion amount, and peak pressure are selected as the monitoring items, and a first stage injection speed and barrel 3 temperature as the molding condition items. Thus, the trend chart is displayed with a time base on its abscissa axis, and the influence of the set values on the measured values can be grasped with ease.

7 Claims, 7 Drawing Sheets

U.S. PATENT DOCUMENTS

| | | | |
|---|---|---|---|
| 6,381,512 B1* | 4/2002 | Saitou et al. | 700/200 |
| 6,684,264 B1* | 1/2004 | Choi | 710/15 |
| 6,848,895 B2* | 2/2005 | Konishi et al. | 425/130 |
| 6,904,333 B2* | 6/2005 | Morimura | 700/197 |
| 6,915,182 B2* | 7/2005 | Usui et al. | 700/204 |
| 7,117,050 B2* | 10/2006 | Sasaki et al. | 700/83 |
| 7,216,005 B2 | 5/2007 | Shioiri et al. | 700/48 |
| 2002/0054041 A1* | 5/2002 | Usui et al. | 345/440 |
| 2003/0082255 A1* | 5/2003 | Konishi et al. | 425/171 |
| 2004/0044434 A1* | 3/2004 | Morimura | 700/197 |
| 2004/0148136 A1* | 7/2004 | Sasaki et al. | 702/188 |
| 2004/0186607 A1* | 9/2004 | Yoshinaga et al. | 700/109 |
| 2007/0156279 A1* | 7/2007 | Dalley | 700/197 |

FOREIGN PATENT DOCUMENTS

| | | |
|---|---|---|
| EP | 1 393 880 | 3/2004 |
| JP | 2-99310 | 4/1990 |
| JP | 4-267119 | 9/1992 |
| JP | 2001129862 | 11/1999 |
| JP | 11-333899 | 12/1999 |
| JP | 2001-293761 | 10/2001 |
| JP | 2001293761 | 10/2001 |
| JP | 2002-273773 | 9/2002 |
| JP | 2003-1686 | 1/2003 |
| JP | 2003-145262 | 5/2003 |
| JP | 2004-82649 | 3/2004 |
| JP | 2004-155117 | 6/2004 |
| JP | 2004-155125 | 6/2004 |
| JP | 2004-164026 | 6/2004 |

OTHER PUBLICATIONS

Pro-Set 700 Injection Molding Control System; Product Data; Rockwell Automation; 12 pages.*

About.com; "Modflow Plastics Xpert Monitors Injecting Molding over the Internet"; 2 pages.*

Archive.org; 1 page showing date of About.com article referenced in "v", from above.*

Husky Hot Runners; Shotscope article describing software by Husky Injection Molding Systems, Inc.; 2 pages.*

Japanese Patent Office Notice of Reasons for Rejection, mailed May 15, 2007 and issued in corresponding Japanese Patent Application No. 2004-202996.

* cited by examiner

FIG. 1

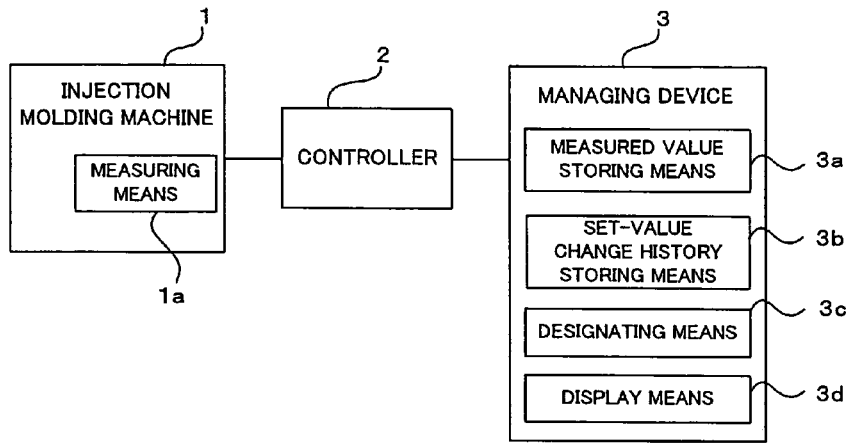

FIG. 2

| DATA NO. | TIME OF MEASUREMENT | SHOT COUNTER | INJECTION TIME | CYCLE TIME | MINIMUM CUSHION AMOUNT | PEAK PRESSURE | ... |
|---|---|---|---|---|---|---|---|
| 1 | Tm(1) | S(1) | D1(1) | D2(1) | D3(1) | D4(1) | ... |
| 2 | Tm(2) | S(2) | D1(2) | D2(2) | D3(2) | D4(2) | ... |
| . | . | . | . | . | . | . | . |
| i | Tm(i) | S(i) | D1(i) | D2(i) | D3(i) | D4(i) | ... |
| . | . | . | . | . | . | . | . |
| N | Tm(N) | S(N) | D1(N) | D2(N) | D3(N) | D4(N) | ... |

FIG. 3

| DATA NO. | TIME OF MEASUREMENT | SHOT COUNTER | ITEM ID | BEFORE CHANGE | AFTER CHANGE |
|---|---|---|---|---|---|
| 1 | Tc(1) | Sc(1) | I1(1) | B(1) | A(1) |
| 2 | Tc(2) | Sc(2) | I1(2) | B(2) | A(2) |
| . | . | . | . | . | . |
| i | Tc(i) | Sc(i) | I1(i) | B(i) | A(i) |
| . | . | . | . | . | . |
| N | Tc(N) | Sc(N) | I1(N) | B(N) | A(N) |

FIG. 4

| DATA NO. | TIME OF MEASUREMENT | SHOT COUNTER | SET VALUE #1 | SET VALUE #2 | ... | SET VALUE #M |
|---|---|---|---|---|---|---|
| 1 | Tc(1) | Sc(1) | S1(1) | S2(1) | ... | SM(1) |
| 2 | Tc(2) | Sc(2) | S1(2) | S2(2) | ... | SM(2) |
| . | . | . | . | . | . | . |
| i | Tc(i) | Sc(i) | S1(i) | S2(i) | ... | SM(i) |
| . | . | . | . | . | . | . |
| N | Tc(N) | Sc(N) | S1(N) | S2(N) | ... | SM(N) |

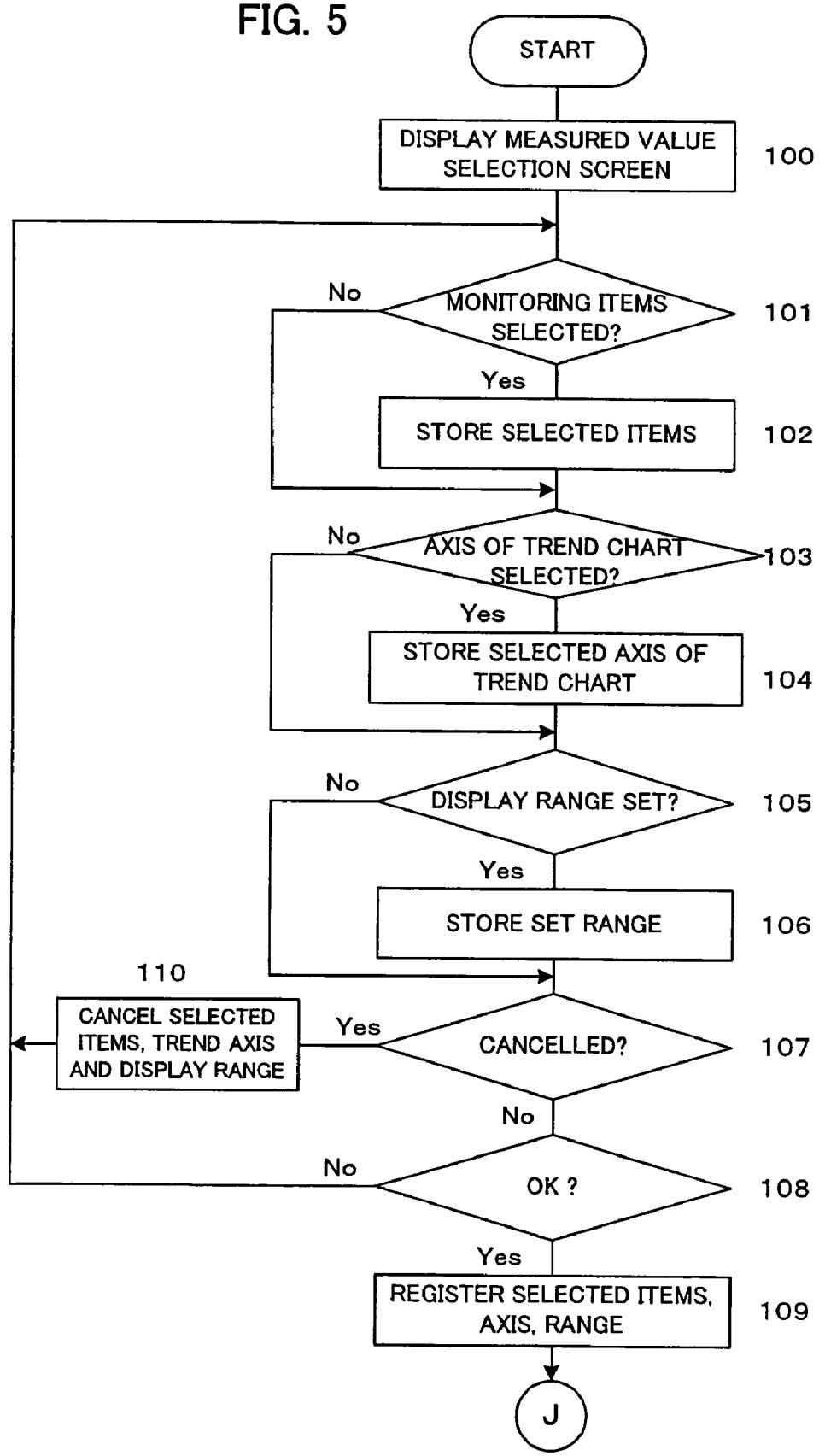

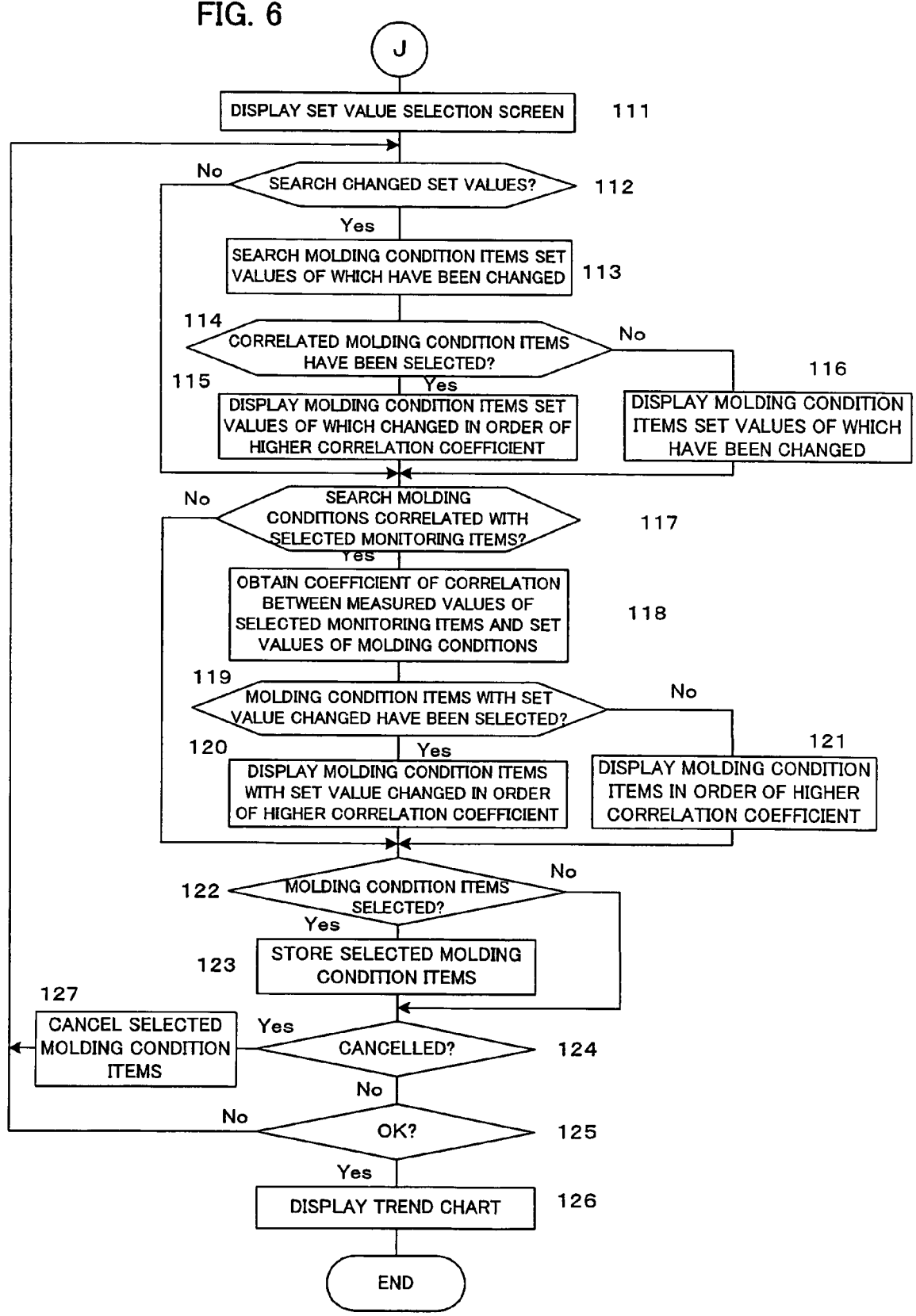

| NAME OF DATA \ DATA NO. | 1 | 2 | ... | N |
|---|---|---|---|---|
| TIME | T(1) | T(2) | ... | T(N) |
| MEASURED VALUE D1 | D1(1) | D1(2) | ... | D1(N) |
| MEASURED VALUE D2 | D2(1) | D2(2) | ... | D2(N) |
| SET VALUE S1 | S1(1) | S1(2) | ... | S1(N) |
| SET VALUE S2 | S2(1) | S2(2) | ... | S2(N) |
| ... | ... | ... | ... | ... |
| SET VALUE SM | SM(1) | SM(2) | ... | SM(N) |

| MEASURED VALUE \ SET VALUE | S1 | S2 | ... | SM |
|---|---|---|---|---|
| D1 | R1(1) | R1(2) | ... | R1(M) |
| D2 | R2(1) | R2(2) | ... | R2(M) |

MONITORING DEVICE AND MONITORING METHOD FOR INJECTION MOLDING MACHINE

BACKGROUND OF THE INVENTION

1. Field of the Invention

The present invention relates to a device for monitoring various variables indicative of molding states of an injection molding machine and a monitoring method.

2. Description of Related Art

In order to monitor molding states or discriminate molding failure, values for various monitoring items for each molding cycle are measured, including molding cycle time, injection time, kneading time, cushion amount, nozzle and barrel temperatures, peak pressure, etc. The measured values are displayed and used for the molding state monitoring and product quality discrimination.

In a known monitoring system (see JP2767654B), for example, measured values of monitoring items acquired for each cycle, such as cycle time, injection time, minimum cushion amount, peak pressure, etc., are displayed in a trend chart form, and their variations are monitored to be utilized for quality control or the like.

In another known system (see JP11-333899A), a change history of set values of molding conditions, such as injection, hold pressure, metering, temperature, etc., is stored and displayed.

In still another system (see JP7-4844B2), values of measured data, such as filling time, plasticization time, injection start time, injection end time, etc., are displayed in the time series for each molding cycle. If set values of various molding conditions change as this is done, the changed items and the set values before and after the change are displayed.

In alternative known systems (see JP2001-293761A and JP2003-1686A), quality data, such as die temperature, filling time, cushion amount, etc., obtained from various sensors are displayed in a data trend graph, a line graph along a time base, or change of molding condition items is discriminately displayed in a colored bar graph. In another system (JP2003-145262A), measured values and set values (reference, upper limit, and lower limit values) for monitoring items are displayed for each shot or molding cycle. In still another system (JP2004-82649A), moreover, set pressure-holding values and their detected measured values, as well as set speed values and their detected measured values, are displayed for each molding cycle.

As described in JP2767654B and JP2003-145262A and JP2004-82649A, the measured values of the monitoring items indicative of the molding states for each molding cycle are generally obtained and displayed in order to monitor the molding states or discriminate molding failure. Since the measured values of the monitoring items indicative of the molding states vary depending on change of the set values of the correlated molding conditions, moreover, the change of the set values of the molding conditions and the measured values of the monitoring items are displayed together, as described in JP7-4844B2, JP2001-293761A and JP2003-1686A. In the method described in JP7-4844B2, however, monitoring data on the measured values of each shot or molding cycle are displayed in a graphic form, and the set values before and after the change are displayed. Although the time when the set values are changed can be detected with ease, it is hard to grasp the influence of the change on the measured values of the monitoring items.

In the systems described in JP2001-293761A and JP2003-1686A, moreover, the measured values of some monitoring items are displayed as the trend graph along the time base, and sections in which the molding conditions are changed are also displayed. However, the molding condition items with their set values changed and the changed set values are not displayed on the same screen as the trend graph. Thus, it is hard to grasp the influence of the change of the molding conditions on the measured values of the monitoring items.

Since the molding states change depending on the change of the set values of the molding conditions, the apparent measured values of the monitoring items indicative of the molding states change when the molding conditions are changed. However, the molding conditions are diverse and large in number. In general, measured values such as die and barrel temperatures can be supposed to correspond one-to-one to the set values. However, the measured values of the monitoring items never correspond one-to-one to the set values of the molding conditions, and some measured values of the monitoring items change in complicated relation to a plurality of set values.

For example, a generally-called peak pressure or the maximum pressure value that is measured in an injection pressure hold process is an important item in molding quality control. However, the peak pressure changes as the set values of the injection speed, resin melting temperature, injection pressure hold switching position, etc. are changed. Further, the metering time is influenced by a set value of the barrel temperature that melts a resin, as well by set values of the rotational frequency and metering back pressure that are directly related to the action of a metering axis during metering operation. The minimum cushion amount corresponds to the most advanced position of a screw in the injection pressure hold process. It is influenced by set values of very many molding conditions, such as the injection speed, hold pressure, pressure hold time, resin melting temperature, etc., as well as by a metering end position and a switching position for the injection pressure hold process.

As described above, the various monitoring items indicative of the molding states are influenced by the set values of a plurality of molding condition items. In some supposed cases, therefore, the molding condition items that influence the measured values of the monitoring items may vary depending on the set values.

SUMMARY OF THE INVENTION

The present invention provides a monitoring device for an injection molding machine in which changes of set values of molding conditions and changes of measured values of monitoring items are displayed as a trend chart on a common axis so that they can be grasped correspondingly.

A monitoring device of the present invention comprises: measuring means for measuring values of monitoring items indicative of molding states in each molding cycle; storing means for storing the values measured by the measuring means; set-value change history storing means for storing a history of change of set values of molding condition items; display-item designating means for designating one or more monitoring items and one or more molding condition items; and display means for displaying the measured values of the designated monitoring items and the history of change of the set values of the designated molding condition items in a form of a trend chart on a common axis. With the above arrangement, the measured values of the monitoring items and the history of change of the set value of the molding conditions are simultaneously displayed in a graphic form of the trend chart so that relation between the measured values and the set values can be grasped with ease.

The monitoring device may further comprise display-range designating means for designating a display range of the trend chart, and the display-item designating means may designate molding condition items to be displayed on the trend chart among one or more molding condition items set values of which have been changed in the display range designated by the display-range designating means.

Further, the display-item designating means may designate molding condition items to be displayed on the trend chart among one or more molding condition items set values of which are correlated with the measured values of the designated monitoring items.

The monitoring device may be constituted by the injection molding machine and a managing device.

A monitoring method of the present invention comprise: storing measured values of monitoring items indicative of molding states in each molding cycle and a history of change of set values of molding condition items; designating one or more monitoring items and one or more molding condition items indirectly influential in the measured values of the designated monitoring items; and displaying the measured values of the designated monitoring items and set values of the molding condition items indirectly influential in the measured values in a form of a trend chart on a common axis.

The monitoring method may further comprise designating a display range, and molding condition items to be displayed on the trend chart may be designated among one or more molding condition items set values of which have been changed within the display range. Further, the molding condition items to be displayed on the trend chart may be designated among one or more molding condition items set values of which are correlated with the measured values of the designated monitoring items.

Since the measured values of the monitoring items and the set values of the molding condition items can be displayed as the trend chart on the common axis, the influence of the set values of the molding condition items on the measured values of the monitoring items can be grasped with ease. Further, the molding condition items with the set values changed within the display range can be selectively displayed. Since the set values of the molding condition items correlated with the measured values of the monitoring items selected for display can be selectively displayed, moreover, the influence of the set value change for the molding conditions on the measured values of the monitoring items can be grasped efficiently.

BRIEF DESCRIPTION OF THE DRAWINGS

FIG. 1 is a schematic block diagram showing a first embodiment of the present invention;

FIG. 2 is a diagram illustrating measured value storing means according to the first embodiment;

FIG. 3 is a diagram illustrating an example of set value change history storing means according to the first embodiment;

FIG. 4 is a diagram illustrating another example of the set value change history storing means according to the first embodiment;

FIG. 5 is a flowchart showing trend chart display processing according to the first embodiment;

FIG. 6 is a continuation of the flowchart showing the trend chart display processing;

DETAILED DESCRIPTION

Figure 7:
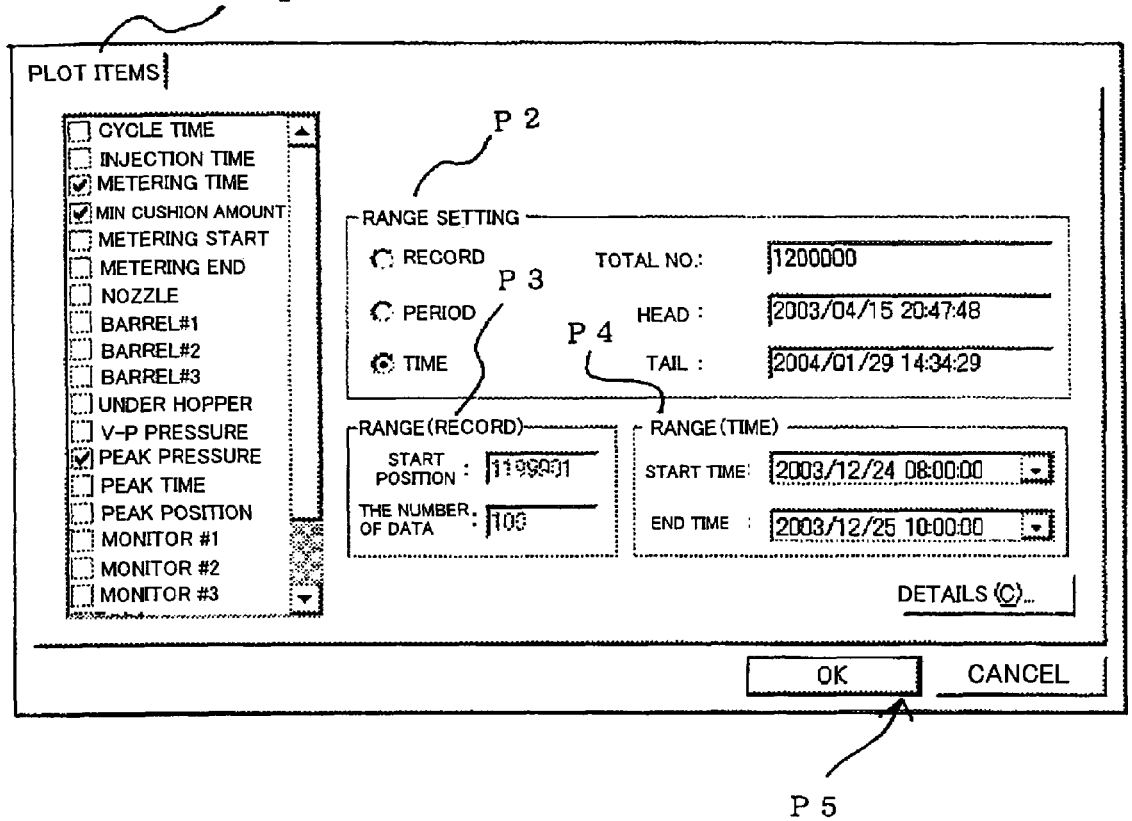
FIG. 7 shows an example of a measured value selection screen according to the first embodiment.

FIG. 1 is a schematic block diagram showing a first embodiment of the present invention. An injection molding machine 1 is provided with various measuring means 1a for detecting molding conditions, such as a temperature sensor, pressure sensor, speed sensor, position sensor, etc. The temperature sensor detects temperatures of dies and barrels, while the pressure sensor detects a resin pressure. The speed sensor detects the rotational speed of an injection screw and an injection speed or the axial movement speed of the injection speed. The position sensor detects the moved position of the injection screw.

The injection molding machine 1 is controlled by a controller 2, and measured values obtained by measuring means 1a are collected by the controller 2 and utilized for the control of the injection molding machine 1.

The above-described configuration and functions are the same as those of a conventional injection molding machine, so that a detailed description of them is omitted.

In the present embodiment, a managing device 3 is connected to the controller 2 of the injection molding machine 1 by a communication line or the like. The managing device 3 is composed of a computer, such as a personal computer, and is provided with display means 3d, formed of a processor, memory, CRT, liquid crystal, etc., and manual input means, such as a keyboard, mouse, etc., for inputting data and commands. The manual input means constitutes designating means 3c for designating display items, display range, etc. As mentioned later, moreover, the memory is provided with measured value storing means 3a and set-value change history storing means 3b.

Various set values are inputted to the controller 2 through its own display means and manual input means. Based on the set values and a control program, the controller 2 controls the injection molding machine 1. Further, the controller 2 collects the various measured values from the measuring means 1a that is attached to the injection molding machine 1. Some of the measured values are utilized to control the injection molding machine 1. Based on the measured values measured by the measuring means 1a, moreover, the controller 2 obtains measured values of various monitoring items.

With every molding cycle, on the other hand, the managing device 3 acquires measured values of the monitoring items collected and obtained by the controller 2, and stores them into the measured value storing means 3a.

FIG. 2 is a diagram illustrating the measured value storing means 3a that stores the measured values. A data number represents the number of sampled memories of monitor data (measured values of monitoring items). If the monitor data are obtained with every molding cycle, a measured value can be obtained for each monitoring item with every molding cycle. In the examples shown in FIG. 2, data include times Tm(i) at which measured values of the monitoring items concerned are acquired, values S(i) in a shot counter for counting molding cycles, injection times D1(i), cycle times D2(i), minimum cushion amounts D3(i), and peak pressures D4(i) (i=1, 2, 3, . . . ).

The managing device 3 may acquire the measured values of the aforesaid monitoring items from the controller 2 and store them into the measured value storing means 3a with every molding cycle. In a steady molding mode, moreover, the measured values may be sampled with every plurality of cycles or every fixed time, and the number of data may be reduced by thinning. Thus, in the managing device 3, the measured value storing means 3a is stored with a history of the measured values of the monitoring items.

Every time the set values of the molding conditions are changed, furthermore, the managing device 3 stores them into the set-value change history storing means 3b. FIG. 3 is a diagram illustrating an example of the set-value change history storing means 3b. In this example, an i'th data number is stored with a set value change time Tc(i), then value Sc(i) in the shot counter, changed molding condition item I1(i), unchanged set value B(i), changed set value A(i) in a set every time the set values of the molding conditions are changed.

FIG. 4 is a diagram illustrating another example of the set-value change history storing means 3b.

If the set value of any one of the molding conditions is changed, in this example, those of all other molding condition items are stored together with the changed set value. Thus, a set of set values of the then molding conditions are stored for each item number. If the set values of the molding conditions are changed, therefore, the managing device is stored with the then time Tc(i), shot counter value Sc(i), and set values S1(i) to SM(i) for molding conditions 1 to M.

In storing the measured values into the measured value storing means 3a shown in FIG. 2, the changed set values of the molding conditions may be stored so that molding condition items ID and changed and unchanged set values corresponding to measured value data, as shown in FIG. 3. Since one or more set value changes sometimes correspond to one measured value, the individual changes are stored.

Instead of storing the set values of the molding conditions with every change of one set value, as shown in FIG. 4, the set value of each then molding condition may be stored corresponding to the measured value data stored in the measured value storing means 3a shown in FIG. 2.

As described above, the managing device 3 stores the measured values (monitor data) for the monitoring items from the controller 2 of the injection molding machine in the time series, and also stores a set value change history for the molding conditions. If an operator then inputs a trend chart display command with the manual input means of the managing device 3, the processor of the managing device 3 carries out the processing shown in FIGS. 5 and 6 and displays a trend chart.

First, the processor displays a measured value selection screen on the display means 3d (Step 100).

FIG. 7 shows an example of the measured value selection screen displayed on the display means 3d. A list of the monitoring items is displayed in a column P1 for "Plot Items" so that all the monitoring items can be displayed by scrolling. A monitoring item to be displayed as the trend chart is selected among the displayed monitoring items. A column P2 for "Range Setting" is a column in which a variable axis (abscissa axis) for the trend chart display is designated, and "Record", "Period", and "Time" are selectable. If "Record" is selected, a variable on the abscissa axis of the trend chart is a shot number (molding cycle number). If "Period" or "Time" is selected, the variable on the abscissa axis of the trend chart is time.

If "Record" is selected, a column P3 for "Range (Record)" can be set, a starting shot number for a section in which the trend chart is displayed can be entered in a column "Starting Position", and a shot number of to be displayed can be entered in a column "Data Number".

If "Period" or "Time" is selected as the variable w, a column P4 for "Range (Time)" can be set. If "Time" is set, "Start Time" and "End Time" of the trend chart can be set. If "Period" is set, "Start Time" and a period duration can be set. In the example shown in FIG. 7, "Time" is selected as the variable axis, and the start and end times are set.

If an "OK" button in a column P5 for "OK" and "Cancel" buttons is depressed, set items are registered and stored. If the "Cancel" button is depressed, all set items are cancelled. A total shot number based on the measured values or monitor data and the start and end times for the acquisition of the data are displayed in the column P2 for "Range Setting". Thus, the selection of the range is facilitated.

Returning to the flowchart of FIG. 5, the measured value selection screen shown in FIG. 7 is displayed on the display means 3d in Step 100. The processor repeatedly determines whether or not monitoring items displayed in plotted items are selected (Step 101), whether or not the axis of the trend chart is selected (Step 103), whether or not the display range is selected (Step 105), whether or not the "Cancel" button is depressed (Step 107), and whether or not the "OK" button is depressed (Step 108).

When the operator selects the monitoring items by using the mouse or the like (Step 101), the selection of the selected monitoring items is displayed and stored (Step 102). In the example shown in FIG. 7, "Metering Time", "Minimum Cushion Amount", and "Peak Time" are selected.

If the axis of the trend chart is selected (Step 103), moreover, it is stored. If the selected axis of the trend chart is "Record", the column P3 for "Range (Record)" is made settable. If the selected axis is "Period" or "Time", on the other hand, the column P4 for "Range (Time)" is made settable (Step 104).

If set values are entered in the column P3 or P4 for the range (Step 105), the entered values are stored (Step 106).

If the "Cancel" button is depressed (Step 107), moreover, all of the selected items, axis of trend chart and set display range are cancelled (Step 110), and the procedure returns to Step 101, in which selective setting is performed again.

If the "OK" button is depressed (Step 108), the selected items, trend chart axis, and range are settled and registered (Step 109). Then, the screen of the display means 3d is switched over to a set value selection screen and displayed (Step 111).

Figure 8:
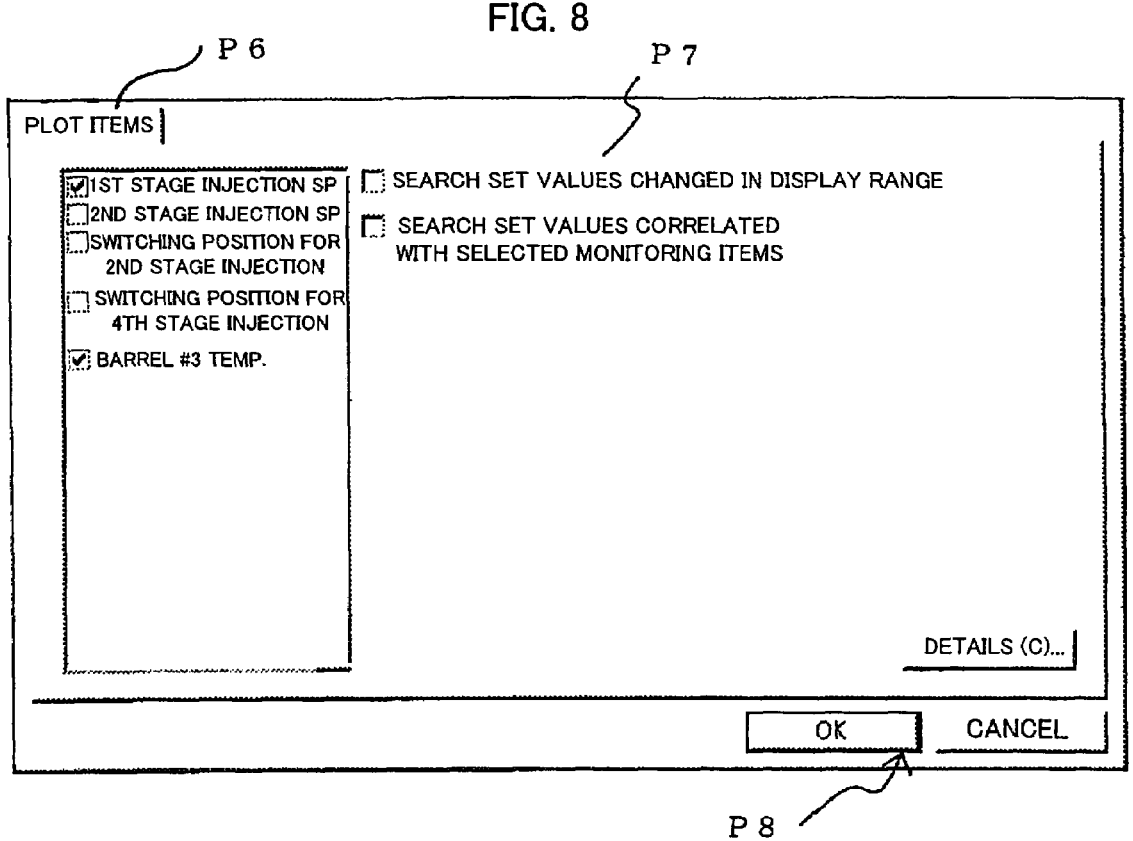
FIG. 8 shows an example of a set value selection screen according to the first embodiment.

FIG. 8 shows a display example of this set value selection screen. Molding condition items are displayed in a column P6 for "Plot Items". When a method for retrieving set values, which will be mentioned later, is not set, all the molding condition items are displayed so that they can be selected.

A column P7 is intended for the specification of the set value retrieval method. If "Search Set Values Changed in Display Range" is selected, those set values which are changed within the display range stored in Step 109 are searched, and the display in the column P6 for "Plot Items" is switched so that molding conditions with changed set values are displayed. If "Search Set Values Correlated with Selected Items" is selected, those molding condition items which are correlated with the measured values of the monitoring items registered and stored in Step 109 are displayed in the column P6 for "Plot Items". If both "Search Set Values Changed in Display Range" and "Search Set Values Correlated with Selected Items" are selected, moreover, those molding condition items which have changed set values within the display range stored in Step 109 and are correlated with the measured values of the monitoring items registered and stored in Step 109 are displayed in the column P6 for "Plot Items".

If both "Search Set Values Changed in Display Range" and "Search Set Values Correlated with Selected Items" are invalidated and excluded from selection, all the molding condition items are displayed in the column P6 for "Plot Items".

Alternatively, the molding condition items correlated with the measured values of the monitoring items may be registered in advance. In Step 111, in this case, only the registered molding condition items corresponding to the monitoring items stored and registered in Step 109 are displayed. Alternatively, moreover, all the molding condition items may be displayed. In this case, the registered molding condition items are displayed with different colors or specific icons.

Alternatively, furthermore, all the molding condition items may be displayed in the column P6 for "Plot Items". If "Search Set Values Changed in Display Range" or/and "Search Set Values Correlated with Selected Items" are selected and set, in this case, the molding condition items concerned are displayed with different display colors or icons. If all the molding condition items are displayed in black and if "Search Set Values Changed in Display Range" is selected, for example, molding condition items with set values changed within the display range are turned to yellow, for example. If "Search Set Values Correlated with Selected Items" is selected, the correlated molding condition items (with correlation coefficients not lower than a predetermined value) are turned to green, for example. If both "Search Set Values Changed in Display Range" and "Search Set Values Correlated with Selected Items" are selected, the molding condition items that agree with both these requirements are turned to red as they are displayed. Thus, the molding condition items are displayed in black, yellow, green, and red in the column P6 for "Plot Items", depending on the aforesaid retrieval method.

If an "OK" button in a column P8 for "OK" and "Cancel" buttons is depressed, set items are registered and stored. If the "Cancel" button is depressed, all set items are cancelled.

Returning to the flowchart of FIG. 6, the aforesaid set value selection screen is displayed on the display means 3d in Step 111. The processor repeatedly determines whether or not "Search Set Values Changed in Display Range" in the column P7 is selected (Step 112), whether or not "Search Set Values Correlated with Selected Monitoring Items" is selected (Step 117), whether or not the molding condition items are selected (Step 122), whether or not the "Cancel" button is depressed (Step 124), and whether or not the "OK" button is depressed.

If "Search Set Values Changed in Display Range" is selected and set (Step 112), it is determined whether or not there is any molding condition items set values of which has been changed within the display range registered and stored in Step 109 by searching the set-value change history storing means 3b (Step 113). Then, it is determined whether or not the correlated molding condition items have been already selected (Step 114). If they are not selected, the molding condition items set values of which have been changed obtained by the retrieval are displayed in the column P6 for "Plot Items" (or the previously displayed molding condition items are displayed in different colors) (Step 116). If the correlated molding condition items are selected in Steps 117, 118 and 121, which will be mentioned later, the molding condition items the set values of which changed within the display range obtained in Step 113 are displayed in the order of higher correlation (or the items are displayed in different colors) (Step 115).

If "Search Set Values Correlated with Selected Items" is selected (Step 117), on the other hand, the coefficient of correlation between the measured values of the registered and stored monitoring items and the set values of the molding condition items is obtained within the display range registered and stored in Step 109 (Step 118). A method for obtaining this correlation coefficient will be described later.

It is determined whether or not "Search Set Values Changed in Display Range" is already selected and if the molding condition items to be displayed are selected (Step 119). If "Search Set Values Changed in Display Range" is not selected and if the molding condition items to be displayed are not selected, the molding condition items are displayed in the column P6 for "Plot Items" in the order of higher correlation coefficient (Step 120). As mentioned before, in this case, the items may be displayed in different colors.

If the molding condition items displayed in the column P6 for "Plot Items" is then selected (Step 122), the selected items are stored (Step 123). Unless the "Cancel" or "OK" button is depressed (Step 124 or 125), the processes of Steps 112 to 126 are executed, and the molding condition items are selected. If the "Cancel" button is depressed, all the previously selected items are cancelled, whereupon the procedure returns to Step 112. If the "OK" button is depressed (Step 125), on the other hand, a set trend axis (time or shot number) registered and stored in Step 109 is set as an abscissa axis. The measured values of the selected monitoring items registered and stored in Step 109 and a history of the set values of the selected molding condition items stored in Step 123 are read out from the measured value storing means 3a and the set-value change history storing means 3b, and displayed as a trend chart, as shown in FIG. 9.

Figure 9:
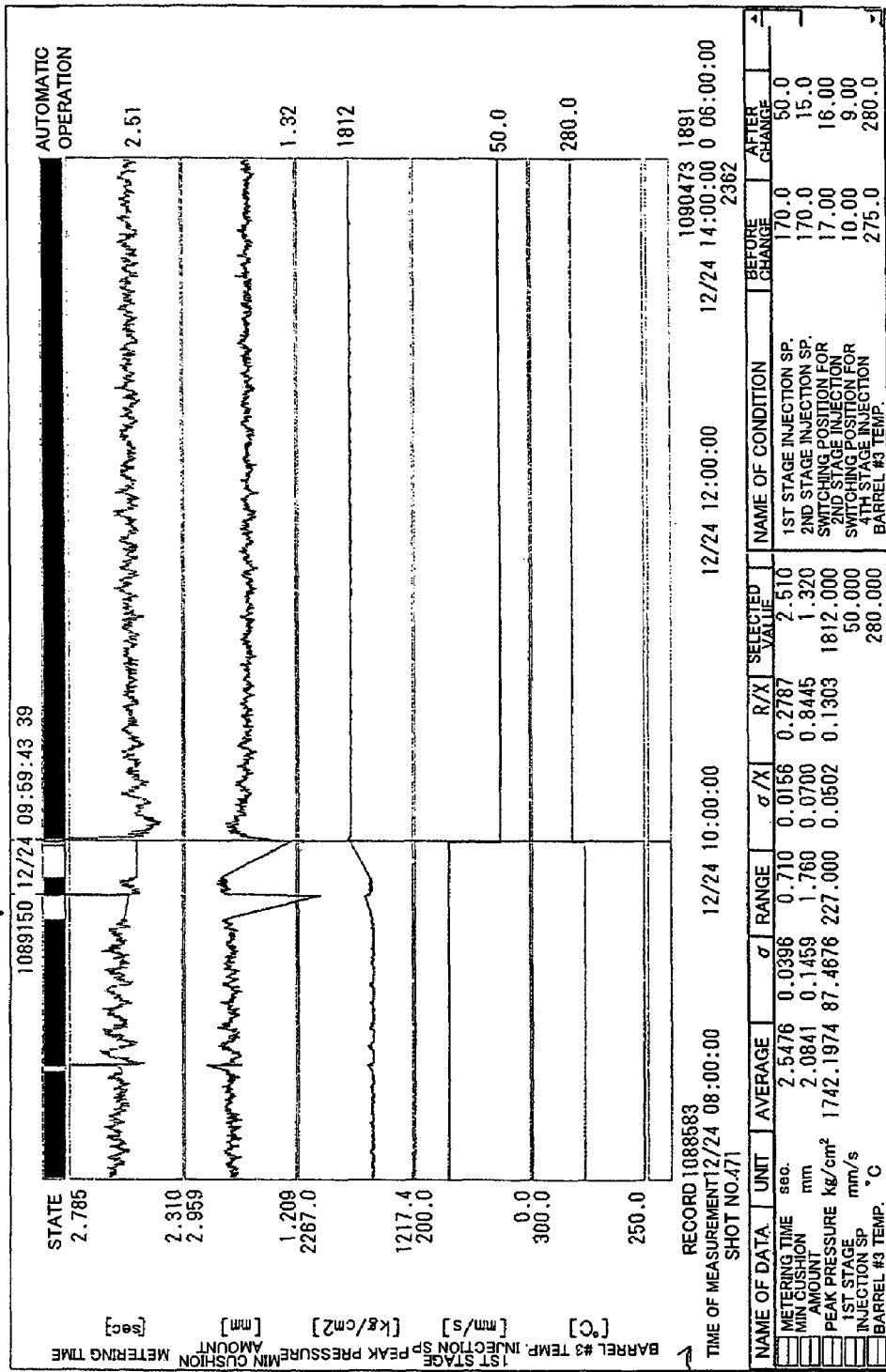
FIG. 9 shows an example of a trend chart display screen according to the first embodiment.

In the example shown in FIG. 9, "Metering Time", "Minimum Cushion Amount", and "Peak Time" are selected as the monitoring items, and "Barrel 3 Temperature" and "1st Stage Injection Speed" are selected as the molding condition items, and a trend chart is displayed such that the measured values and set values of these items are graphed with time on its abscissa axis. Further, the set values of "Barrel 3 Temperature" and "1st Stage Injection Speed" as the molding condition items are changed into 12/24 09:59:43 (see column P14).

The value of the abscissa axis (time base) and the shot counter value (record) are displayed in a column P10. Further, statistical data are displayed in a column P11, and measured values of axial positions (times) selected with the mouse, keyboard, etc. are numerically displayed in a column P12. Displayed in a column P13, moreover, are a set value change history for the molding conditions for the positions selected with the mouse, keyboard, etc. and set values before and after the change. In this example, a point of time when the set values of the molding condition items (when "Barrel 3 Temperature" and "1st Stage Injection Speed" on the trend chart are changed) are selected, so that the set values before and after the change are displayed.

Since the history of the set values of the molding condition items and the history of the measured values of the monitoring items are displayed on the common axis (abscissa axis), as shown in FIG. 9, the influence of the change of the set values on the measured values of the monitoring items can be understood at a glance. Among the displayed set values of the molding condition items and measured values of the monitoring items, moreover, those ones which are selected by the operator and have high correlation coefficients are diagonal axes on the trend chart.

Figures 10, 11, 12:
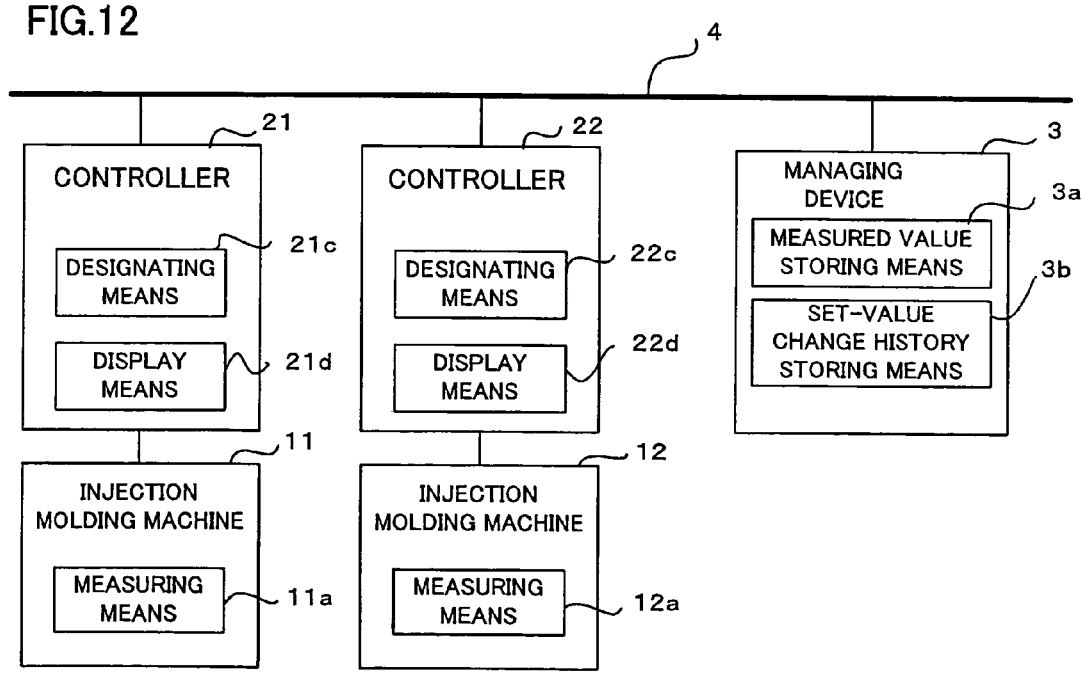
FIG. 10 is a diagram for illustrating a method for obtaining a correlation coefficient according to the first embodiment.
FIG. 11 is a diagram showing a coefficient of correlation between set values and measured values according to the first embodiment.
FIG. 12 is a schematic block diagram showing a second embodiment of the invention.

FIG. 10 is a diagram for illustrating the method for obtaining the correlation coefficient in Step 118. Let it be supposed that monitoring items D1 and D2 are selected, measured values of the monitoring items D1 and D2, compared with times T(1), T(2), T(3), . . . T(N) for a selected display range, are D1(1), D1(2), D1(3), . . . D1(N) and D2(1), D2(2), D2(3), . . . D2(N), respectively, and corresponding set values of molding condition items S1 to SM are S1(1), S1(2), S1(3), . . . S1(N) to SM(1), SM(2), SM(3), . . . SM(N). These data are obtained from the data stored in the measured value storing means 3a and the set-value change history storing means 3b.

In FIG. 10, these data are tabulated correspondingly. The coefficient of correlation between the set values S1 for the molding conditions and the measured values D1 can be obtained by calculation with use of the data S1(1), S1(2), S1(3), . . . S1(N) and the data D1(1), D1(2), D1(3), . . . D1(N) as variables, and the obtained correlation coefficient is given by R1(1). A correlation coefficient R2(1) between the set values S1 for the molding conditions and the measured values D2 can be obtained by calculation with use of the data S1(1), S1(2), S1(3), . . . S1(N) and the data D2(1), D2(2), D2(3), . . . D2(N) as variables. Likewise, a correlation coefficient R1(2) between the set values S2 for the molding conditions and the measured values D1 can be obtained by calculation with use of the data S2(1), S2(2), S2(3), . . . S2(N) and the data D1(1), D1(2), D1(3), . . . D1(N) as variables. Thereafter, correlation coefficients R1(1) to R1(M) and R2(1) to R2M are obtained in like manner, as shown in FIG. 11. The molding condition items are displayed in the column P6 for "Plot Items" of FIG. 8 in the order of priority of the correlation coefficients thus obtained. Further, only the molding condition items with correlation coefficients not lower than a predetermined value are displayed. Since some displayed set values, such as temperatures, are influenced with delay by the change, the time for the acquisition of the correlation coefficients may be shifted.

The managing device 3 is provided in the first embodiment of the present invention shown in FIG. 1. Since the controller of the injection molding machine is provided with storing means, a display unit, and manual input means, however, these elements may be used to constitute the measured value storing means 3a, set-value change history storing means 3b, designating means 3c, and display means 3d. Thus, the controller of the injection molding machine may be provided with all these means without including any managing device. Even in the case where the managing device 3 is provided, moreover, both the controller and the managing device of the injection molding machine may be provided with measured value storing means and set value change history storing means as backup means. In this case, the designating means 3c and the display means 3d may be composed of display units and manual input means, such as keyboards, attached to the controller and the managing device of the injection molding machine.

Further, a plurality of controllers may be connected to the managing device 3.

In this case, the designating means 3c that is attached to the managing device 3 is provided with means for designating a controller to be displayed so that the controller to be displayed can be switched.

Furthermore, the managing device 3 may be connected with one or more display units (client terminals) that have the same functions as the designating means 3c and the display means 3d.

FIG. 12 is a block diagram showing a second embodiment of the present invention. In this second embodiment, a plurality of injection molding machines are connected to a managing device through a communication network or the like. More specifically, a managing device 3 and controllers 21 and 22 of the injection molding machines are connected by a communication network 4, and injection molding machine bodies 11 and 12 are connected to the controllers 21 and 22, respectively. The injection molding machine bodies 11 and 12 are provided, respectively, with measuring means 11a and 12a, which are composed of various sensors for detecting the molding states. Display units and keyboards or other manual input means of the controllers 21 and 22 constitute display means 21d and 22d for displaying screens shown in FIGS. 7 and 9 and designating means 21c and 22c for designating display items or the like.

The managing device 3 is provided with measured value storing means 3a and set-value change history storing means 3b, which can be stored with measured values of monitoring items and a set value change history for molding conditions of each injection molding machine, respectively.

When trend chart commands are inputted through the manual input means of the controllers 21 and 22 of each injection molding machine, processors of the controllers 21 and 22 perform the same processing as the one shown in FIGS. 5 and 6, thereby displaying a trend chart. The second embodiment differs from the first embodiment only in that data on each corresponding injection molding machine are read through the communication network 4 from data stored in the measured value storing means 3a and the set-value change history storing means 3b of the managing device 3 when molding condition items with changed set values are searched in Step 113 and when the coefficient of correlation between measured values and molding condition set values in Step 118. The processing shown in FIGS. 5 and 6 is executed by the processors, designating means 21c and 22c, and display means 21d and 22d of the controllers 21 and 22.

In this case, data on the different controllers 21 and 22 may be displayed by the designating means 21c and 22c that are attached to the controllers.

Further, the managing device 3 may be connected with one or more display units (client terminals) that have the same functions as the designating means 21c and 22c and the display means 21d and 22d.

Furthermore, the measured value storing means 3a and the set-value change history storing means 3b may be arranged in the controllers 21 and 22, respectively, not in the managing device 3.

What is claimed is:

1. A monitoring device for an injection molding machine, comprising:
    measuring means for measuring values of monitoring items indicative of molding states in each molding cycle;
    storing means for storing the values measured by said measuring means;
    set-value change history storing means for storing a history of change of set values of molding condition items;

display-item designating means for designating one or more monitoring items and one or more molding condition items; and display means for displaying the measured values of the designated monitoring items and the history of change of the set values of the designated molding condition items in a form of a trend chart on a common axis;

wherein said display-item designating means allows an operator to designate molding condition items to be displayed on the trend chart among one or more molding condition items set values which are correlated with the measured values of the designated monitoring items.

2. A monitoring device for an injection molding machine according to claim 1, further comprising display-range designating means for designating a display range of the trend chart, wherein said display-item designating means further allows an operator to designate molding condition items to be displayed on the trend chart among one or more molding condition items set values of which have been changed in the display range designated by said display-range designating means.

3. A monitoring device for an injection molding machine according to claim 1, wherein the monitoring device further comprises a controller placed between the injection molding machine and a managing device in which are disposed the storing means, the set-value change history storing means, the display-item designating means and the display means.

4. A monitoring method for an injection molding machine, comprising:

storing measured values of monitoring items indicative of molding states in each molding cycle and a history of change of set values of molding condition items;

designating one or more monitoring items and one or more molding condition items which determine changes of the designated monitoring items; and displaying the measured values of the designated monitoring items and set values of the one or more molding condition items in a form of a trend chart on a common axis wherein said designating includes allowing an operator to designate molding condition items to be displayed on the trend chart among one or more molding condition items set values which are correlated with the measured values of the designated monitoring items.

5. A monitoring method for an injection molding machine according to claim 4, further comprising designating a display range, wherein molding condition items to be displayed on the trend chart are designated among one or more molding condition items set values of which have been changed within the display range.

6. A monitoring method for an injection molding machine according to claim 4, wherein molding condition items to be displayed on the trend chart are designated among one or more molding condition items set values of which are correlated with the measured values of the designated monitoring items.

7. A monitoring device for an injection molding machine, comprising:

measuring unit for measuring values of monitoring items indicative of molding states in each molding cycle;

a managing device including a data storage unit to store the values measured by said measuring means and a history of change of set values of molding conditions, a display item selecting unit to allow selecting at least one monitoring item and at least one molding condition, and a display unit to display the measured values of the at least one monitoring item and the history of change of the set values of the at least one molding condition in a form of a trend chart on a common axis; and a controller to receive the measured values of monitoring items and transmit the values to the managing device, and to allow a user to input changes of the molding conditions.

* * * * *